United States Patent
Gilbert et al.

(10) Patent No.: US 11,810,155 B1
(45) Date of Patent: Nov. 7, 2023

(54) MAINTAINING A PRODUCT GRAPH NETWORK BASED ON CUSTOMER PURCHASE HISTORY

(71) Applicant: Amazon Technologies, Inc., Seattle, WA (US)

(72) Inventors: Adam Jacob Gilbert, Seattle, WA (US); Dustin Kwan, Bellevue, WA (US); Oliver N. Dsouza, Sammamish, WA (US); Robert Alan Stock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 17/011,101

(22) Filed: Sep. 3, 2020

(51) Int. Cl.
*G06Q 30/0251* (2023.01)
*G06Q 30/0273* (2023.01)
*G06Q 30/0201* (2023.01)

(52) U.S. Cl.
CPC ..... *G06Q 30/0275* (2013.01); *G06Q 30/0254* (2013.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 10,438,266 | B1 * | 10/2019 | Batra | H04L 67/025 |
| 2014/0278916 | A1 * | 9/2014 | Nukala | G06Q 30/0243 |
| | | | | 705/14.42 |
| 2015/0081420 | A1 * | 3/2015 | Min | G06Q 30/0244 |
| | | | | 705/14.43 |
| 2016/0117740 | A1 * | 4/2016 | Linden | G06Q 50/01 |
| | | | | 705/14.66 |
| 2016/0189211 | A1 * | 6/2016 | Bhagwan | G06Q 30/0255 |
| | | | | 705/14.53 |
| 2018/0204244 | A1 * | 7/2018 | Roundtree | G06Q 30/0245 |
| 2020/0051162 | A1 * | 2/2020 | Yenisetty | G06Q 30/08 |

OTHER PUBLICATIONS

H. An Yan, "Personalized Complementary Product Recommendations", retrieved from the Internet <URL: https://cseweb.ucsd.edu/~jmcauley/pdfs/www22b.pdf>, published on Apr. 25, 2022 (Year: 2022).*

* cited by examiner

*Primary Examiner* — Sam Refai
(74) *Attorney, Agent, or Firm* — Lee & Hayes, P.C.

(57) ABSTRACT

A system for maintaining product networks to provide recommendations for bid amounts to third party entity devices. A service provider entity device tracks product purchase history for customers and determines relationships associated with products purchased by the customers. When a webpage is loaded by a customer device, a third party entity device receives a bid request from a publisher device and transmits a bid recommendation request to the service provider entity device. The service provider entity device determines input features including a base bid, a propensity score, and a pacing score based on the relationships. The service provider entity device transmits a bid recommendation response with a recommended bid amount to the third party entity device, based on the input features.

20 Claims, 8 Drawing Sheets

700 ⟶

SERVER COMPUTER(S) 502(1)-502(N)

RECEIVING, BY AN ENTITY DEVICE ASSOCIATED WITH A SERVICE PROVIDER AND FROM A CUSTOMER DEVICE, AT LEAST ONE PURCHASE REQUEST SIGNAL THAT INCLUDES A CUSTOMER IDENTIFIER ASSOCIATED WITH A CUSTOMER
702

MAINTAINING A PRODUCT NETWORK, COMPRISING A FIRST NODE INCLUDING A FIRST PRODUCT IDENTIFIER REPRESENTING A FIRST PRODUCT THAT WAS PURCHASED BY THE CUSTOMER; A SECOND NODE INCLUDING A SECOND PRODUCT IDENTIFIER REPRESENTING A SECOND PRODUCT, WHEREIN A PLURALITY OF FIRST CUSTOMERS PURCHASED BOTH THE FIRST PRODUCT AND THE SECOND PRODUCT VIA THE SERVICE PROVIDER; AND A THIRD NODE INCLUDING A THIRD PRODUCT IDENTIFIER REPRESENTING A THIRD PRODUCT, WHEREIN A PLURALITY OF SECOND CUSTOMERS PURCHASED BOTH THE FIRST PRODUCT AND THE THIRD PRODUCT VIA THE SERVICE PROVIDER
704

DETERMINING, BASED AT LEAST IN PART ON THE PRODUCT NETWORK, A FIRST CONNECTION BETWEEN THE FIRST PRODUCT AND THE SECOND PRODUCT AND A SECOND CONNECTION BETWEEN THE FIRST PRODUCT AND THE THIRD PRODUCT
706

DETERMINING, BASED AT LEAST IN PART ON THE FIRST CONNECTION BEING GREATER THAN THE SECOND CONNECTION, AN INTEREST LEVEL OF THE CUSTOMER WITH RESPECT TO THE SECOND PRODUCT
708

CALCULATING A RECOMMENDED BID AMOUNT ASSOCIATED WITH THE SECOND PRODUCT BASED AT LEAST IN PART ON THE INTEREST LEVEL
710

TRANSMITTING, TO THIRD PARTY ENTITY DEVICE ASSOCIATED WITH THE SECOND PRODUCT, THE RECOMMENDED BID AMOUNT
712

FIG. 7

MAINTAINING A PRODUCT GRAPH NETWORK BASED ON CUSTOMER PURCHASE HISTORY

BACKGROUND

Links for purchasing products online can be embedded in websites that are seen by users over the Internet. Bid requests can be provided by publishers of websites and to clients that can bid for pending opportunities to embed the links as advertisements in advertisement spaces of the websites. In response to receiving a bid request, a client can send a dynamic bid to a publisher of a website. The dynamic bid can specify an advertising message and a bid amount that the client is willing to pay to have an advertising message presented by the publisher and on the website. The advertising message, along with a link associated with the advertisement message for purchasing a product, can be presented on the website, in addition to other content. A number of times that an advertisement is displayed ("impressions"), as well as a number of times that the advertisement is selected by a potential customer ("click-through rate") can be tracked by the client. The client also can track data on users, including user attributes, such as name, age, gender, and location, as well as browsing history or other behavioral data, such as websites visited, searches performed, and other advertisements selected.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

FIG. 7 illustrates a process for maintaining a product network within a service provider device to determine an interest level of a customer with respect to a product, in accordance with embodiments of the disclosure.

DETAILED DESCRIPTION

Figure 1:
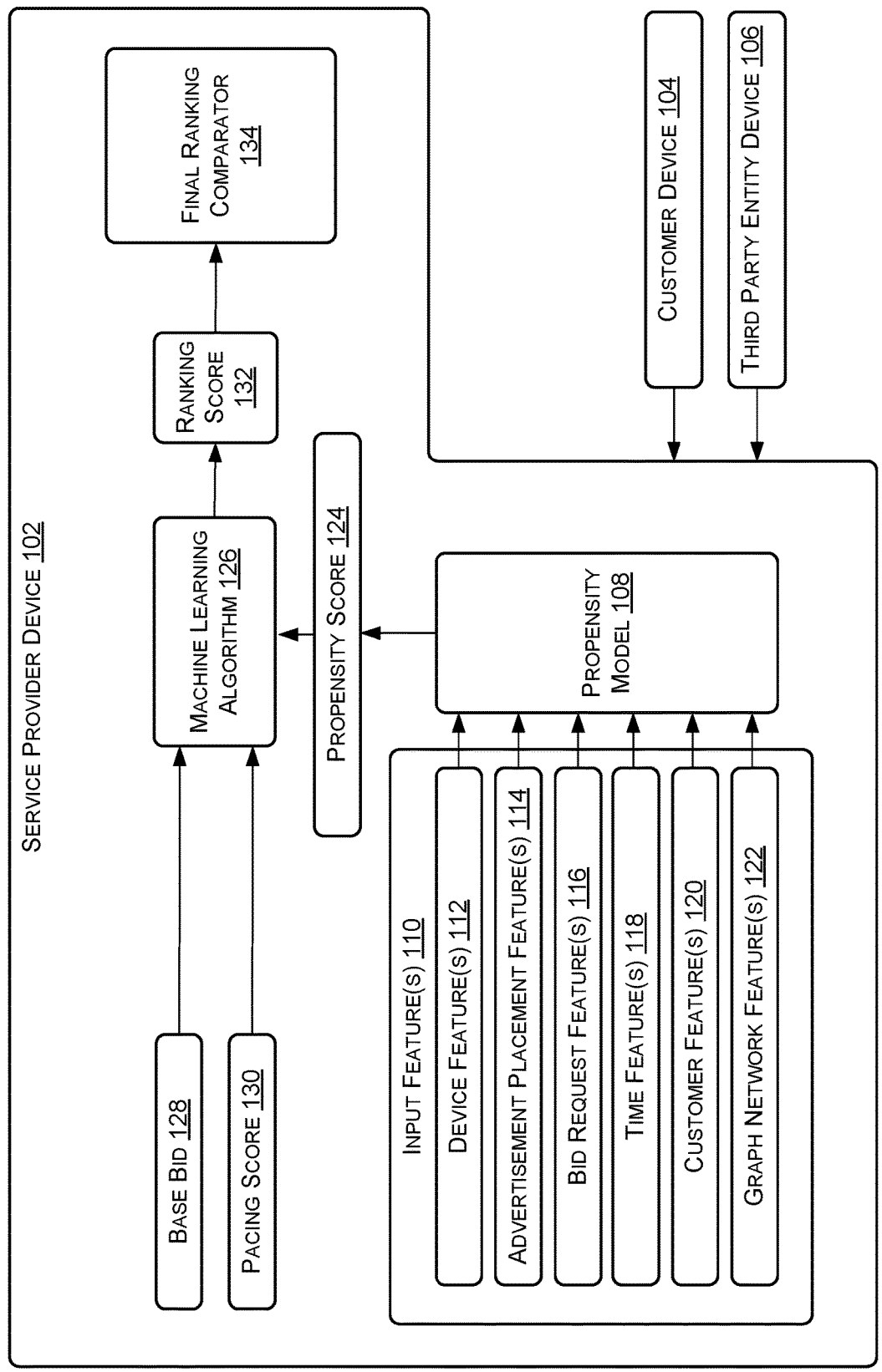
FIG. 1 shows an illustrative environment including a service provider device, a customer device, and a third party entity device.

Described herein are systems and/or processes for maintaining a product network based on customer purchase history and electronically transmitting recommended bid amounts to third party entities. For example, third party entities can receive bid requests for advertisement spaces of webpages of publishers that do not have access to customer purchase information. The third party entities can request recommended bid amounts from service providers that maintain databases with customer purchase information. The service providers can track customer purchase information associated with customers to which the webpages are presented and send the recommended bid amounts to the third party entities. The third party entities can transmit bid responses to the publishers for the advertisement spaces of the websites, based on the recommended bid amounts.

As discussed herein, a third party entity (e.g., "ABC company," "XYZ corporation," "Athletic Shoes, Inc.," etc.) can receive a bid request from a publisher (e.g., "DEF company," "UVW corporation," "News Publisher, Inc.," etc.) that hosts an online advertisement exchange for an advertising space. The third party entity can transmit a recommended bid amount request to a service provider. According to various embodiments, the publisher can transmit the bid request associated with an invitation for an advertisement space in a webpage, responsive to the webpage being loaded in a browser operated by a computing device associated with a customer (e.g., user that previously purchased one or more products from the service provider). The service provider can analyze customer purchase history data associated with the customer, as well as other customers that previously purchased one or more products from the service provider. The service provider can calculate a recommended bid amount (e.g., recommended amount of money to bid on the advertisement space) based on a probability that the customer will click on an advertisement associated with the third party entity being presented in the advertisement space. The service provider can transmit a recommended bid amount response with the recommended bid amount, to the third party entity. The third party entity can transmit a bid response based on the recommended bid amount, to the publisher.

In certain embodiments, the third party entity that initially receives the bid request associated with a bid request for a dynamic bid and can filter the bid request by applying keywords against a product catalog or other database of advertising subject information. The third party entity can identify a product or a category of products that can be purchased or otherwise obtained and that relate to a search query performed by a customer via a webpage, or characteristics or demographics of the customer. The third party entity can determine an eligibility of the customer to receive an advertisement. The third party entity can determine a base bid amount, based on the eligibility, and further based on the identified product or category of products, as specified in the bid request. The eligibility and the base bid amount can be determined further based on a time at which the bid request is received, the characteristics or demographics of the customer, information about amounts of already-known bids, etc. The third party entity can construct and transmit a bid recommendation request including the base bid amount, to the service provider.

In some embodiments, the service provider can determine the recommended bid amount based on a product network that is maintained by the service provider. The product network can be maintained based on multiple inputs including the base bid, a propensity score (e.g., P-action score), and a pacing score. The propensity score is a confidence factor indicating an interest level of the customer to which the webpage is presented with respect to a product associated with an advertisement embedded in the advertisement space. The pacing score is a value representative of how aggressively the third party entity intends to place bids for advertisements associated with the product or category of products. The recommended bid amount can be utilized by the third party entity to determine a final bid amount for the advertisement space. As a result, the service provider can determine a distribution associated with the customer and other customers. The distribution provides a comparison between a number of products purchased from the service provider and by the customer, and a number of products purchased from the service provider and by each of more than one other customers, via the service provider.

In some embodiments, the service provider can calculate the propensity score by identifying data relevant to the identified product or the category of products and inputting the data into a propensity model. The propensity model can perform calculations based on the data and outputs the propensity score. The propensity model can output the propensity score by computing the data based on multiple scores including a path score, a distance score, and a community score. Because the service provider has access to, and stores, customer purchase information associated with the customer to which the webpage is presented, the service provider can calculate a recommended bid amount more accurately than other providers that do not maintain databases with customer purchase history. The other providers may not have access to purchase histories of customers since they do not sell products, either in physical stores or online. Thus, the third party entity that receives the recommended bid amount from the service provider is able to more accurately determine the final bid amount, thereby more effectively identifying customers that are likely to select an advertisement. The third party entity is able to increase overall profits by more accurately customizing selection of the customers to receive advertisements, and more accurately customizing selection of the advertisements that are sent to the customers. Instead of selecting advertisements for products that are associated with previous searches that are performed by the customers, the third party entity is able to select advertisements for other products that are different from, but related to, the products associated with the previous searches. The third party entity can select advertisements associated with products that other customers have purchased from the service provider, along with one or more of the product products associated with the previous searches of the customer. For example, the customer is more likely to select an advertisement for a product related to, or utilized in conjunction with, a product that was previous purchased by the customer, than another similar or substantially identical product (e.g., product from another third party entity but with the same purpose and/or function as the previously purchased product).

In some embodiments, the publisher can receive a bid response from the third party entity. The publisher can compare the final bid amount in the bid response received from the third party entity with other final bid amounts in other bid responses received from other third party entities, based on the bid request. The publisher can compare the final bid amount with amounts of other cached bids associated with the third party entity, in response to earlier bid requests having similar queries. The publisher can compare the final bid amount with earlier-received conventional prospective bids. The publisher can further compare the final bid amount with any combination thereof.

In this manner, the methods, apparatuses, and systems described herein improve a functioning of a computing device by reducing a congestion at a third party entity, for example, by providing increased capacity at the service provider. For example, allocating computational tasks to the service provider during periods of expected peak capacity can reduce a processing load at the third party entity. The reduced congestion at the third party conserves computing resources and lowers costs of maintaining computing operations, increases efficiency and optimizes computational power, and decreases an amount of time required for determining the final bid amount that is sent to the publisher. Further, decreasing processing tasks performed by the third party entity prevents network congestion at the third party entity. Additionally, the service provider architecture described herein can be applied to a plurality of third party entities, as need and demand grow, thereby allowing greater access to scaling advertisement systems.

FIG. 1 shows an illustrative recommended bid amount calculation network 100 including a service provider device 102, a customer device 104, and a third party entity device 106. In some embodiments, the service provider device 102 can include a propensity model 108 (e.g., a supervised learning model, a machine learning (ML) model (e.g., a generalized linear regression model, a non-linear model, etc.), etc.) that inputs one or more input features 110 and outputs a propensity score 124 based on the input features 110. The input features 110 include one or more device features 112, one or more advertisement placement features 114, one or more bid request features 116, one or more time features 118, one or more customer features 120, one or more graph network features 122, or any combination thereof. The input features 110 can be received by the service provider device 102 and from a third party entity device 106.

The device features 112 can include data identifying device data received from a customer device 104 with which a customer is associated, the customer device 104 accessing a website of a publisher that is displayed via a web browser or a mobile application page on the customer device 104. The device data can include an operating system version, a device model, a language of the operating system, a cellular carrier identity associated with a cellular carrier providing a wireless network by which the device data is received, an internet protocol (IP) address by which the customer device 104 connects to the wireless network, a model of the customer device 104, an operating system being operated by the customer device 104, a screen size of the customer device 104, a screen orientation of the customer device 104, a connection type of the customer device 104, or any combination thereof.

The advertisement placement features 114 can include features describing an advertiser or campaign associated with an advertisement for which the input features 110 are being analyzed. For example, the advertisement placement features 114 can include an advertisement identifier (ID), an advertisement type ID, a campaign ID, a placement of the advertisement on the customer device 104, an advertiser ID, or any combination thereof.

The bid request features 116 can include features describing at least one of a place or a time that the advertisement will appear on the customer device 104. For example, the bid request features 116 can include a webpage address associated with a webpage loaded in the web browser, contextual information associated with the webpage, data identifying the web browser that retrieves, renders and/or facilitates interaction of the customer device 104 with web content, at least one of a slot size, position, or orientation available for presentation of the advertisement, an advertising fold (e.g., above the fold, below the fold, etc.) available for presentation of the advertisement, or any combination thereof.

The time features 118 can include features associated with time information indicating a start time of presentation of the advertisement, a length of time during which the advertisement is presented, time information indicating an end time of presentation of the advertisement, or a combination thereof. The time information can include a time of a day or a day of a week, or a combination thereof, associated with presentation of the advertisement.

The customer features 120 can include features associated with data points indicating the customer device 104 to which the advertisement is to be presented. The customer features 120 can include categorical features, the categorical features including demographic data associated with the customer, such as an age, an annual income, a gender, a location, an education level, a marital status, or any combination thereof, of the customer. The customer features 120 can include continuous features, the continuous features including products that were previously purchased by the customer and other customers, as well as other related products that were also previously purchased by the other customers. The customer purchase history can include information associated with a purchase of each of more than one product from the service provider and by the customer via the customer device 104 or another device. The continuous features can be identified and stored by the service provider device 102, and utilized to calculate a recommended bid amount more accurately than other providers that do not sell products and/or that do not maintain databases with customer purchase history. The accuracy of calculating the recommended bid amount of the service provider device 102, in comparison to other providers that do not sell products, is increased in areas of cookieless advertisement service.

The graph network features 122 can include one or more features indicating relationships between the customer associated with the customer device 104 and one or more products purchased by the customer. The graph network features 122 can include one or more features indicating one or more relationships between each of one or more other customers and one or more products purchased by each of the other customers.

In some embodiments, the propensity model 108 can analyze the input features 110. The propensity model 108 can determine and output the propensity score 124 to a machine learning algorithm 126, based on the input features 110, the propensity score 124 representing a utility or a value of the customer associated with the customer device 104. The propensity score 124 can indicate an interest level of the customer with respect to a product available for selection via an advertisement provided by the third party entity device 106 and presented via the customer device 104, the selection being received from the customer and by the customer device 104. A determination by the propensity model 108 to output the propensity score 124 is a regression problem to output the propensity score 124.

In some embodiments, the machine learning algorithm 126 can input at least one of the propensity score 124, a base bid 128, or a pacing score 130, and output a ranking score 132. The base bid 128 can be an initial bid amount received by the service provider device 102 and from the third party entity device 106. The base bid 128 received from the third party entity device 106 can be input to the third party entity device 106. For example, the base bid 128 can be input via a user interface (UI) of the third party entity device 106 and by a third party entity associated with the third party entity device 106. The base bid 128 can represent a default bid amount to transmit to a publisher that hosts an auction to determine whether to present the advertisement via the customer device 104. By way of example a value of the base bid 128 can be set to $1. The pacing score 130 can be received by the service provider device 102 and from a pacing service that associated with, or operated by, the third party entity device 106. The pacing score 130 can represent a value associated with a level of aggressiveness that the third party entity device 106 intends to take to win the auction and receive the rights to present the advertisement to the customer via a website of the publisher.

For example, the third party entity device 106 can operate an advertisement campaign with a goal to deliver ten million impressions of the advertisement to customers in ten days, with one million impressions of the advertisement being presented each day. The third party entity device 106 can set a value of the pacing score 130 associated with an action on a day (e.g., day five of an advertisement campaign of the third party). The third party entity device 106 can set the value of the pacing score 130 lower based on delivery of impressions of the advertisement over pacing the goal of the advertisement campaign (e.g., six million impressions having been delivered by day five of the advertisement campaign), in comparison to the value of the pacing score 130 based on delivery of the impressions of the advertisement under pacing the goal (e.g., three million impressions having been delivered by day five). If on day five, six million impressions are delivered, then the pacing is one millions impressions ahead of schedule. The pacing score 130 can include a multiplier of a value less than multipliers applied to two previous pacing scores (e.g., a multiplier less than a multiplier used for a pacing score associated with day three and less than a multiplier used for a pacing score associated with day four), to make a bid on the auction less competitive and to slow down the campaign. The pacing score 130 can include a multiplier of a value more than multipliers applied to the two previous pacing scores, to make a bid on the auction more competitive and to speed up the campaign.

In some embodiments, the machine learning algorithm 126 can calculate and output the ranking score 132 based on the at least one of the propensity score 124, the base bid 128, or the pacing score 130. The ranking score 132 can be associated with the recommended bid amount that can be transmitted by the service provider device 102 and to the third party entity device 106. By way of example, a value of the recommended bid amount, with which the ranking score 132 is associated, can be set to $1.20. The value of the recommended bid amount of $1.20 can be set to be higher than the value of $1.00 of the base bid 128, based on a calculation by the machine learning algorithm 126. By setting the value of the recommended bid amount, with which the ranking score 132 is associated, to be higher than the value of the base bid 128, a likelihood of winning an auction for placing the advertisement to be presented via the customer device 104 is increased. The ranking score 132 can represent an estimated financial value to the third party entity by placing the bid on the auction for the advertisement. For example, the ranking score 132 associated with a first estimated financial value can be higher than the ranking score 132 associated with a second estimated financial value, based on the first estimated financial value being higher than the second estimated financial value. The ranking score 132 can be directly proportional to at least one of the base bid 128, the pacing score 130, or the propensity score 124. For example, the ranking score 132 determined based a first value of the base bid 128 can be higher than the ranking score 132 determined based on a second value of the base bid 128, based on the first value of the base bid 128 being higher than the second value of the base bid 128. For example, the ranking score 132 determined based a first value of the pacing score 130 can be higher than the ranking score 132 determined based on a second value of the pacing score 130, based on the first value of the pacing score 130 being higher than the second value of the pacing score 130. For example, the ranking score 132 determined based a first value of the propensity score 124 can be higher than the propensity score 124 determined based on a second value of the propensity score 124, further based on the first value of the propensity score 124 being higher than the second value of the propensity score 124.

In some embodiments, the ranking score 132 is input to a final ranking comparator 134. The final ranking comparator 134 can store the ranking score 132 and compare the ranking score 132 with other ranking scores (e.g., one or more ranking scores previously or subsequently calculated) that are each related to other advertisements associated with the third party entity for the auction. Each of the ranking scores can be stored in the final ranking comparator 134 along with an identifier of the advertisement associated with the ranking score. The final ranking comparator 134 can output the identifier of the advertisement that is associated with a ranking score that is equal to or higher than the other ranking scores.

In some embodiments, the recommended bid amount that is transmitted to the third party entity device 106 based on the ranking score 132 can be utilized by the third party entity device 106 to transmit a bid response to the publisher. The bid response can be transmitted to the publisher to obtain an advertisement space to present the advertisement via the customer device 104. The advertisement presented via the customer device 104 can include a link that will direct the customer to a product page for the product associated with the advertisement, via a website of the service provider 102 or a website of the third party entity device 106. The customer can purchase the product from that product page. When the customer sees the advertisement via the third party website, he/she is more likely to click on it due to its relevancy to the product previously purchased by the customer.

Therefore, and as described herein, the third party entity device 106 can more accurately calculate amounts of dynamic bids transmitted for online advertisement exchanges. By utilizing resources that are accessible to the service provider device 102, but not to other types of providers, the third party entity device 106 gains a competitive advantage over other third party entity devices that transmit bids for a same auction. The third party entity device 106 can transmit the bid for the advertisement to the publisher based on the bid recommendation transmitted by the service provider device 102. The bid recommendation is calculated based on the graph network features 122 associated with the customer by taking information into account that is specific to the product purchase history of the customer.

Furthermore, the graph network features 122 also take product purchase history related to other customers into account, in addition to the product purchase history for customer associated with the customer device 104. Because product purchase information related to a large number of other customers can be tracked and stored by the service provider device 102, the graph network features 122 indicate relationships between products that are similar to products previous purchased by the customer. The relationships can be identified based on the same product that was previously purchased by the customer as well as the other customers and based on other products that were also purchased by the other customers. The relationships can identify those other products as products that might be of interest to the customer associated with the customer device 104. The service provider device 102 can analyze the relationships and increase bid recommendation amounts that are provided to the third party entity device 106. Existing third party entity devices that do not have access to customer purchase history are unable to identify products that are related to products that the customer has previously purchased.

Unlike the existing third party entity devices that are only able to transmit bids to publishers for products that are identical to, or interchangeable with, products that the customer has already purchased, the third party entity device 106 transmits bids for products that are different from, and related to, products that the customer has already purchased. The bids that the third party entity device 106 transmits for advertisements to be presented by the customer device 104 are more likely to be advertisements of interest to the customer. Since the customer is not as likely to be interested in purchasing the same product that the customer has already purchased, the value of advertisements presented to the customer is much higher if the advertisements are for the products related to, but different from, the products that the customer has previously purchased.

Figure 2:
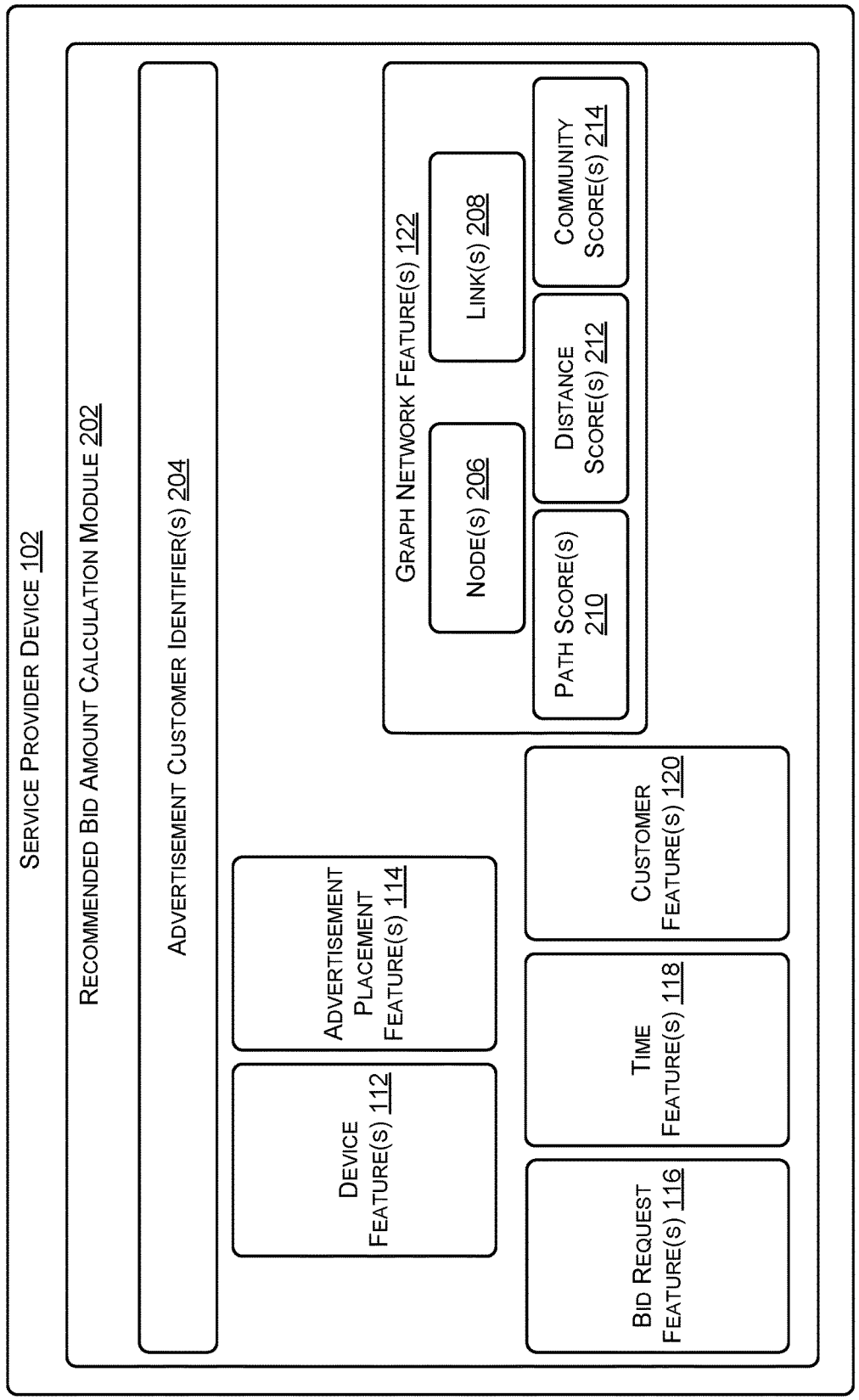
FIG. 2 shows an illustrative service provider device including a recommended bid amount calculation module.

FIG. 2 shows an illustrative service provider device 102 including a recommended bid amount calculation module 202. In some embodiments, the recommended bid amount calculation module 202 can include one or more advertisement customer identifiers 204, each of the advertisement customer identifiers 204 being associated with one of the device features 112, one of the advertisement placement features 114, one of the bid request features 116, one of the time features 118, and/or one of the customer features 120. For example, an advertisement customer identifier 204 can be transmitted by the third party entity device 106 and stored by the service provider device 102 (e.g., stored in a database or data structure associated with the service provider device 102).

In some embodiments, the service provider device 102 can store the advertisement customer identifier 204 along with at least one device feature 112 that is associated with the advertisement customer identifier 204. The at least one device feature 112 that is stored with the advertisement customer identifier 204 can include at least one of a cellular carrier identity associated with a cellular carrier providing a wireless network by which the device data is received (e.g., "One Cellular Carrier"), an internet protocol (IP) address by which the customer device 104 connects to the wireless network e.g., "###. ##. ###. #", a model of the customer device 104 (e.g., "best cell phone model"), an operating system being operated by the customer device 104 (e.g., "best operating system"), a screen size of the customer device 104 (e.g., "###x ###"), a screen orientation of the customer device 104 (e.g., portrait or landscape), or a connection type of the customer device 104 (e.g., mobile).

In some embodiments, the service provider device 102 can store the advertisement customer identifier 204 along with at least one advertisement placement feature 114 that is associated with the advertisement customer identifier 204. The at least one advertisement placement feature 114 that is stored with the advertisement customer identifier 204 can include at least one of an advertisement ID, an advertisement type ID, a campaign ID, a creative ID, or an advertiser ID.

In some embodiments, the service provider device 102 can store the advertisement customer identifier 204 along with at least one bid request feature 116 that is associated with the advertisement customer identifier 204. The at least one bid request feature 116 that is stored with the advertisement customer identifier 204 can include a user agent (e.g., desktop browser or mobile browser).

In some embodiments, the service provider device 102 can store the advertisement customer identifier 204 along with at least one time feature 118 that is associated with the advertisement customer identifier 204. The at least one time feature 118 that is stored with the advertisement customer identifier 204 can include at least one of a start time (e.g., 12:00 PM PDT) or a day (e.g., Sunday) of presentation of the advertisement.

In some embodiments, the service provider device 102 can store the advertisement customer identifier 204 along with at least one customer feature 120 that is associated with the advertisement customer identifier 204. The at least one customer feature 120 that is stored with the advertisement customer identifier 204 can include various demographic information associated with a customer, including at least one of a gender (e.g., male), an age (e.g., 25 years old), an annual income (e.g., $135,000), a location (e.g., Seattle, Wash.), an education level (e.g., undergrad), or a marital status (e.g., married) of the customer associated with the customer device 104.

In some embodiments, the recommended bid amount calculation module 202 can include the graph network features 122. The graph network features 122 can include at least one of one or more nodes 206, one or more links 208, one or more path scores 210, one or more distance scores 212, or one or more community scores 214. The graph network features 122 can be utilized to determine a product network (e.g., product graph network) based on customer purchase history.

In some embodiments, the nodes 206 include product identifiers that represent different products that are offered for sale by the service provider itself or by the service provider on behalf of third party entities. That is, each node 206 may represent different products that have been purchased by customers via service provider, possibly via a website or mobile application of maintained by the service provider, via a telephone call, and so on. In particular, the nodes 206 can include a first node 206 including a first product identifier representing a first product that was purchased by a customer associated with the customer device 104 (and likely many other customers). The nodes 206 can include a second node 206 including a second product identifier representing a second product that was purchased along with the first product by at least one first customer. The nodes 206 can include a third node 206 including a third product identifier representing a third product that was purchased along with the first product by at least one second customer.

In some embodiments, each of the links 208 can represent a connection between a product associated with one of the nodes 206 and another product associated with another one of the nodes 206. For example, the links 208 can include a first link 208 between the first node 206 and the second node 206, the first link 208 representing a first connection between the first product and the second product. The first connection can indicate a first number of customers that have purchased both the first product and the second product via the service provider. The links 208 can include a second link 208 between the first node 206 and the third node 206, the second link 208 representing a second connection between the first product and the third product. The second connection can indicate a second number of customers that purchased both the first product and the third product via the service provider.

In some embodiments, each of the path scores 210 can have a value representing how many products were purchased along with a product associated with the path score 210, by at least one customer. The value can indicate how many paths are associated with each of the products connected with the product associated with the path score 210. The path scores 210 can include a first path score 210 associated with the second node 206, the first path score representing a number of products, with which the product node is associated and which were purchased by any customer that also purchased the second product. For example, the second product (e.g., "brand A sound bar") can have a function of outputting audio based on audio signals received from a TV. The fourth products (e.g., "brand B sound bars") can have a function of outputting audio, which is substantially similar to the function of the second product. A value (e.g., 12) of the first path score 210 can indicate the third number of the fourth products. The path scores 210 can include a second path score 210 associated with the third node 206, the second path score representing a fourth number of products, with which the product node is associated and which were purchased by any customer that also purchased the third product. For example, the second product (e.g., "brand C game console") can have a function of operating video game media. The fifth products (e.g., "brand D game consoles") can have a function of operating video game media, which is substantially similar to the function of the third product.

In some embodiments, each of the distance scores 212 can represent a number of customers that purchased one of the products indicated by the nodes 206 the graph network features 122 along with another one of the products indicated by the nodes 206. For example, the distance scores 212 can include a first distance score 212 based on the first link 208. A value (e.g., 22) of first distance score 212 can indicate at least the first number of at least one first customer, the first number representing how many customers purchased the first product and the second product. The distance scores 212 can include a second distance score 212 based on the second link 208. The second distance score 212 can represent at least the second number of the at least one second customer, the second number indicating how many customers purchased the first product and the third product. The distance score 212 can be inversely proportional to the number of customers that purchased the product associated with a node 206 along with another one of the products associated with another node 206. For example, a higher value of the distance score 212 can be associated with a lower number of customers that purchased both of the products. A lower value of the distance score 212 can be associated with a higher number of customers that purchased both of the products.

In some embodiments, each of the community scores 214 can identify a number of nodes 206 associated with products within a product category. A value of a community score 214 can identify how many products within the product category have been purchased by the customer associated with the customer device 104. For example, the community scores 214 can include a first community score 214 representing a number (e.g., one) that identifies one node associated with a product in a first product category (e.g., home & kitchen) that was purchased by the customer associated with the customer device 104. The community scores 214 can include a second community score 214 representing a number (e.g., one) that identifies one node associated with a product in a second product category (e.g., office products) that was purchased by the customer associated with the customer device 104. The community scores 214 can include a third community score 214 representing a number (e.g., three) that identifies three nodes, each of the three nodes being associated with a product in a third product category (e.g., garden & outdoor) that was purchased by the customer associated with the customer device 104. The first community score 214 can be equivalent to the second community score 214. A value (e.g., NULL) of each of the first community score 214 and the second community score 214 can indicate minimal interest in the first product category and the second product category, by the customer associated with the customer device 104. A value (e.g., three) of the third community score 214 can indicate that the customer associated with the customer device 104 has greater interest in the third product category than in the first product category or the second product category. The value of the third community score 214 that is higher than the value of each of the first community score 214 and the second community score 214 can indicate that the customer associated with the customer device 104 is more likely to purchase another product in the third product category than in the third product category or the second product category.

In some embodiments, the service provider device 102 can store the advertisement customer identifier 204 along with at least one graph network feature 122 that is associated with the advertisement customer identifier 204. The at least one graph network feature 122 that is stored with the advertisement customer identifier 204 can include at least one of a path score 210, a distance score 212, or a community score 214.

In some embodiments, the service provider device 102 can calculate an average distance score of each distance score associated with a link to each of the nodes 206. The service provider device 102 can update the path score 210 for each of the nodes 206 to refrain from incorporating any path associated with a link that has a distance score that is equal to or larger than the average distance score. The service provider device 102 can identify a node associated with a first path score 210 that has a value that is larger than a second path score 210, which another node is associated. The service provider device 102 can increase a recommended bid amount for a product associated with the node that is associated with a first path score 210 that is larger than a second path score 210, with which another node is associated.

Accordingly, the path scores 210, the distance scores 212, and the community scores 214 can be utilized to more accurately determine a confidence level of the customer associated with the customer device 104 selecting the advertisement. The service provider device 102 can more accurately determine the bid recommendation amount transmitted to the third party entity device 106. The bid recommendation amount can be increased based at least in part on a path score 210 that has a value below a threshold path score. The bid recommendation amount can be increased based at least in part on a distance score 212 that has a value below a threshold distance score. The bid recommendation amount can be increased based at least in part on a community score 214 that has a value above a threshold community score. Adjusting the bid recommendation amount reflects how likely a customer is to purchase a product that is associated with a product that the customer previously purchased. The customer is more likely to purchase a product that is unique and not in competition with a large number of similar products. The customer is more likely to purchase a product that is similar to another product that the customer previously purchased, based on the product having been purchased along with the previously purchased product by a large number of other customers. The customer is more likely to purchase a product that is in a product category that includes other products previously purchased by the customer.

Unlike the existing third party entity devices that only have information associated with advertisements previously selected by customers, the third party entity device 106 determines bid amounts based on information related to relationships between products in the previously selected advertisements and other related products. The third party entity device 106 is able to transmit bids for advertisements associated with the related products, not just on advertisements associated with products that are similar or equivalent to products previously purchased by the customer. The third party entity device 106 can increase revenue and profits by more carefully tailoring bids for the advertisements based on more accurate estimations of the interest level of the customer with respect to products available for purchase via selection of links in the advertisements.

Figure 3:
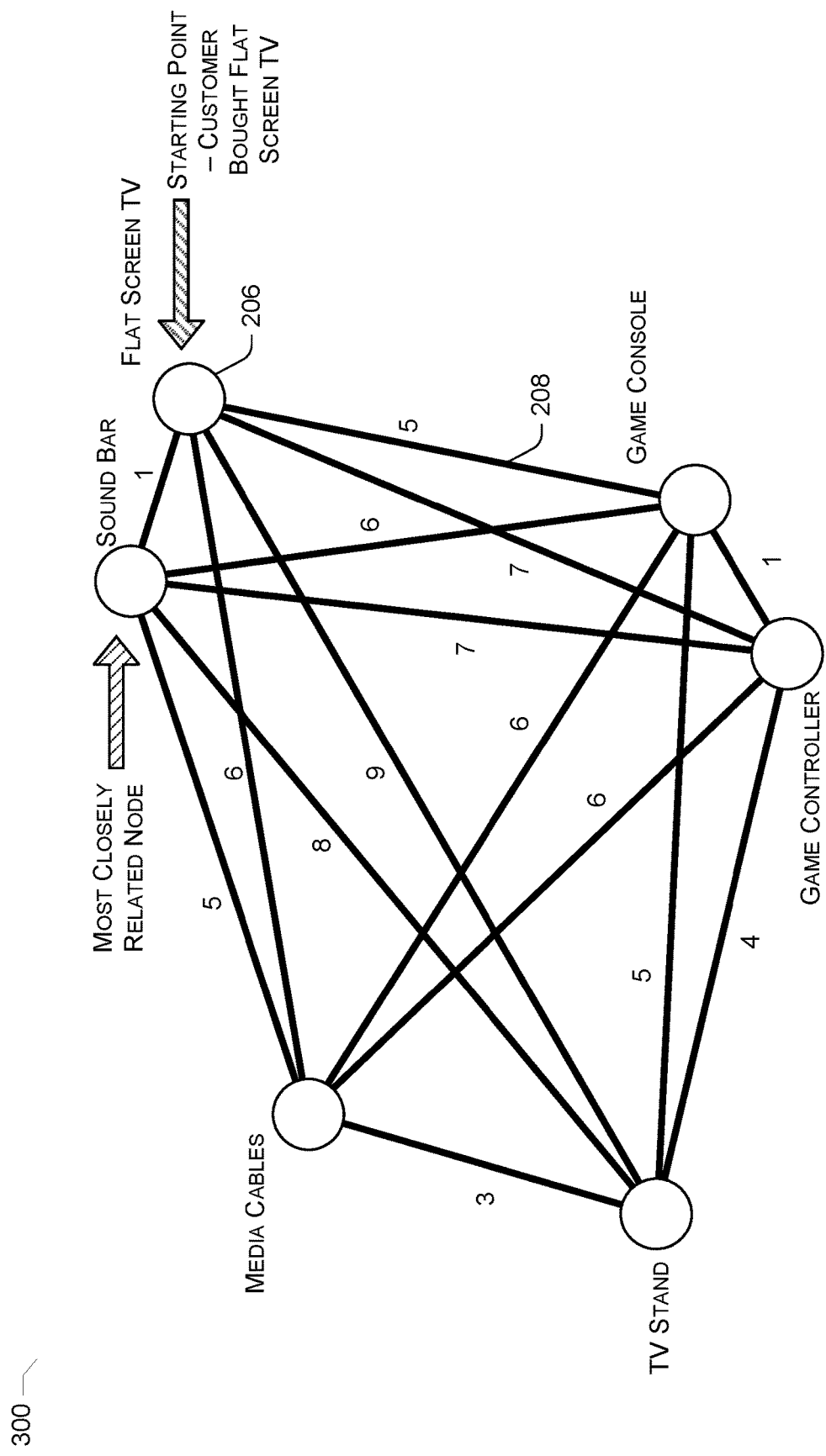
FIG. 3 shows an illustrative graph network including a product purchased by a customer and relationships between the product and other products purchased by other customers.

FIG. 3 shows an illustrative graph network 300 including a product purchased by a customer and relationships between the product and other products purchased by other customers. In some embodiments, the graph network 300 includes at least one of one or more nodes 206 or one or more links 208. The nodes 206 include a first node 206 labeled as "Starting Point—Customer Bought Flat Screen TV." The first node 206 is associated with a first product (e.g., flat screen TV) that was purchased by a customer associated with the customer device 104. The nodes 206 include a second node 206 labeled as "Most Closely Related Node" and associated with a second product (e.g., sound bar that emits sound in conjunction with TVs), a third node 206 associated with a third product (e.g., a game console used to play video games for display via TVs), a fourth node 206 associated with a fourth product (e.g., media cables), a fifth node 206 associated with a fifth product (e.g., a game controller for a game console), and a sixth node 206 associated with a sixth product (e.g., TV stand).

In some embodiments, each of the links 208 can represent a connection between a product associated with one of the nodes 206 and another product associated with another one of the nodes 206. For example, the links 208 can include a first link 208 between the first node 206 and the second node 206, the first link 208 representing a first connection between the first product and the second product. The first connection can indicate a first number of customers that purchased both the first product and the second product. The links 208 can include a second link 208 between the first node 206 and the third node 206, the second link 208 representing a second connection between the first product and the third product. The second connection can indicate a second number of customers that purchased both the first product and the third product.

In some embodiments, a ranking score 132 associated with each of the nodes 206 can be calculated based on at least one of a propensity score 124, a base bid 128, or a pacing score 130. The propensity score 124 can be calculated based on one or more device features 112, one or more advertisement placement features 114, one or more bid request features 116, one or more time features 118, one or more customer features 120, one or more graph network features 122, or any combination thereof. The graph network feature 122 can include at least one of the nodes 206, the links 208, one or more path scores 210, one or more distance scores 212, or one or more community scores 214. Each of the distance scores 212 can be inversely proportional to the number of customers that purchased the product associated with a node 206 along with another one of the products associated with another node 206. A higher value of the distance score 212 can be associated with a lower number of customers that purchased both of the products. A lower value of the distance score 212 can be associated with a higher number of customers that purchased both of the products.

For example, the distance scores 212 can include a first distance score 212 based on a first link 208 between the first node 206 and the second node 206. A value (e.g., 1) of the first distance score 212 can indicate that the second product associated with the second node 206 is more closely related to the first product associated with the first node 206, than is the third product associated with the third node 206. The first distance score 212 can be based at least on the first number of the at least one first customer, the first number representing how many customers purchased the first product and the second product. By way of example, the value of the first distance score 212 can be associated with the first number of the at least one first customer being greater than the second number of at least one second customer. A value (e.g., 5) of a second distance score 212, based on a second link 208 between the first node 206 and the third node 206, can be greater than the value (e.g., 1) of the first distance score.

Accordingly, the graph network 300 identifies the nodes 206, each of with which a product is associated and potentially of interest to the customer. Because the other products associated with nodes 206 are different from, but related to, the product that was previously purchased by the customer, an interest level of the customer with respect to the one of the other products is increased. A likelihood of confidence level associated with the advertisement resulting in the customer purchasing one of the other products is increased with respect to similar or equivalent products that existing third party entities present via advertisements to customers. The customer is less likely to purchase a product that is similar, or equivalent, to a product that he/she has already previously purchased.

By way of example, a customer that accesses a product available for purchase from a service provider can purchase the product (e.g., flat screen TV) from the service provider. The customer can purchase the product by accessing, via a customer device, a webpage operated by the service provider. The service provider can receive a request to purchase the product via the webpage, based on input to the customer device. The service provider can store information associated with the product that was purchased, and information associated with the customer device and the customer associated with the customer device.

The service provider can maintain a product network that shows which other customers purchased the same product as the customer and also purchased another product. The product network can show relationships between the two products, including a potential similarity between the two products. The service provider can utilize the product network to identify a second product (e.g., the TV stand) and a third product (e.g., a game console) that the customer is likely to purchase based on the purchase of the first product by the other customers that have also purchased the TV and the TV stand/game console. The service provider can determine an interest level of the customer with respect to the TV stand/game console. Based on the interest level, the service provider can determine a likelihood of a purchase by the customer of the TV stand/game console (e.g., a confidence level of the customer purchasing the TV stand/game console).

The interest level can be determined based on inputs associated with customers that purchase products from the service provider. The inputs can include a path score, a distance score, and a community score. The path score can represent a number of other products purchased by any of the other customers along with the flat screen TV. The path score can have a value of five, based on at least one of the customers purchasing, along with the first product (e.g., flat screen TV), any of five other products (e.g., the TV stand, the game console, a sound bar, a game controller, or media cables). The distance score can represent a number of customers that purchase one of the other products along with the first product. The distance score can be inversely related to the number of the customers. The distance score can be lower for the sound bar than for the game console, the game controller, the media cables, or the TV stand, based on a large number of customers having purchased the sound bar along with the flat screen TV. A relationship between the sound bar and the flat screen TV is higher than for the other products due to the large number of customers having purchased the sound bar and the flat screen TV. The community score can represent a number of products purchased by the customer within a particular product category. If the customer has purchased only one product within a home & kitchen category and three products in an electronics category, the community level associated with the customer for a product in the electronics category will be higher than for a product in the home & kitchen category.

The service provider an receive a bid recommendation request from a third party entity. The service provider can recommend a bid amount to the third party entity for presenting an advertisement to the customer via a third party website that the customer will visit. The advertisement can present the product (e.g., TV stand or game console) for sale by the third party entity and provide a link that will direct the customer to a product page for the product, via the service provider website or the third party entity website. The customer can purchase the product from that product page. When the customer sees the advertisement via the third party website, he/she is more likely to click on it due to its relevancy to the TV. By recommending increased bid amounts to third party entities based on the interest level of the customer, the likelihood that the customer will click on that corresponding advertisement is increased.

Figure 4:
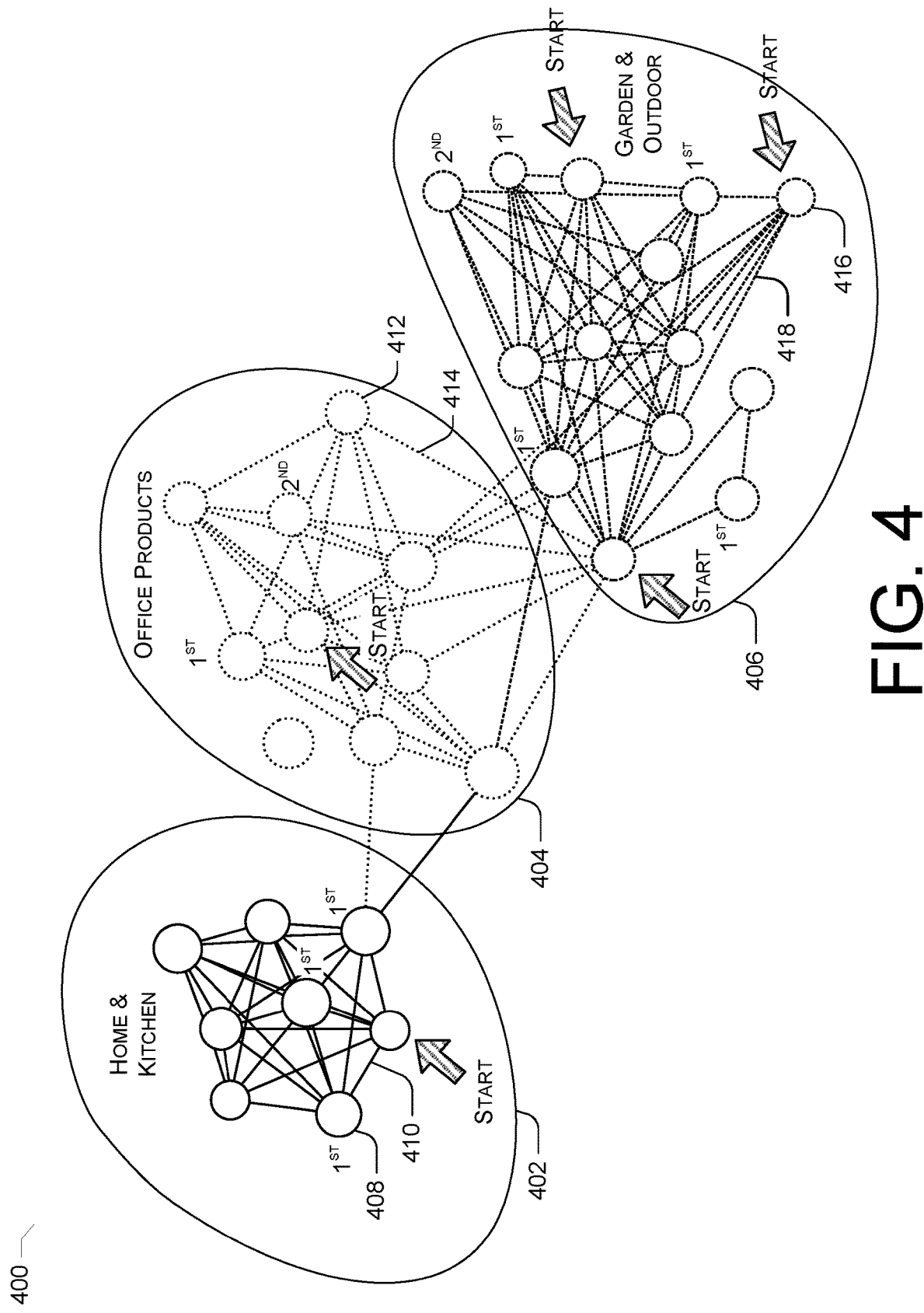
FIG. 4 shows an illustrative graph network including relationships between at least one product purchased by a customer and other products in each category.

FIG. 4 shows an illustrative graph network 400 including relationships between at least one product purchased by a customer and other products in each category. In some embodiments, the graph networks 400 include at least one of a first graph network 402, a second graph network 404, or a third graph network 406. The first graph network 402 includes at least one of one or more first nodes 408 or one or more first links 410. The second graph network 404 includes at least one of one or more second nodes 412 or one or more second links 414. The third graph network 406 includes at least one of one or more third nodes 416 or one or more third links 418. Each of the first graph network 402, the second graph network 404, and the third graph network 406 can be implemented via a service provider device (e.g., service provider device 102), similarly as for the graph network 300 illustrated in FIG. 3.

In some embodiments, each of the first nodes 408, the second nodes 412, and the third nodes 416 includes at least one node labeled "Start" to indicate that it is associated with a product previously purchased by a customer via the service provider. Each of the first nodes 408, the second nodes 412, and the third nodes 416 includes at least one node labeled "$1^{st}$" to indicate that it is directly linked to at least one node associated with a product previously purchased by a customer. Each of the first nodes 408, the second nodes 412, and the third nodes 416 includes at least one node labeled "$2^{nd}$" to indicate that it is indirectly linked to at least one node associated with a product previously purchased by a customer, via one other node.

The service provider device 102 can calculate a community score (e.g., community score 214) to identify a number of nodes associated with products within a product category. For example, the first graph network 402 can be associated with a first product category 402 (e.g., home & kitchen) and have a community score 214 to identify that one node is associated with a product that was purchased by the customer associated with the customer device 104. The second graph network 404 can be associated with a second product category 404 (e.g., office products) and have a community score 214 to identify that one node is associated with a product that was purchased by the customer associated with the customer device 104. The third graph network 406 can be associated with a third product category 406 (e.g., garden & outdoor) and have a community score 214 to identify that three nodes are each associated with a product that was purchased by the customer associated with the customer device 104.

A value (e.g., three) of the third community score 214 can indicate that the customer associated with the customer device 104 has greater interest in the third product category 406 than in the first product category 402 or the second product category 404. The value of the third community score 214 that is higher than the value of each of the first community score 214 and the second community score 214 can indicate that the customer associated with the customer device 104 is more likely to purchase another product in the third product category 406 than in the third product category 406 or the second product category 404. The service provider device 102 can calculate a recommended bid amount for a product associated with the third product category 406 that is higher than for the first product category 402 or the second product category 404.

Accordingly, the community scores 214 can be utilized to more accurately determine a confidence level of the customer associated with the customer device 104 selecting the advertisement. The service provider device 102 can more accurately determine the bid recommendation amount transmitted to the third party entity device 106. The bid recommendation amount can be increased based at least in part on a path score 210 that has a value below a threshold path score. Unlike the existing third party entity devices that only have information associated with advertisements previously selected by customers, the third party entity device 106 is able to transmit bids for advertisements associated with the products associated with a product category that includes other products previously purchased by the customer.

Figure 5:
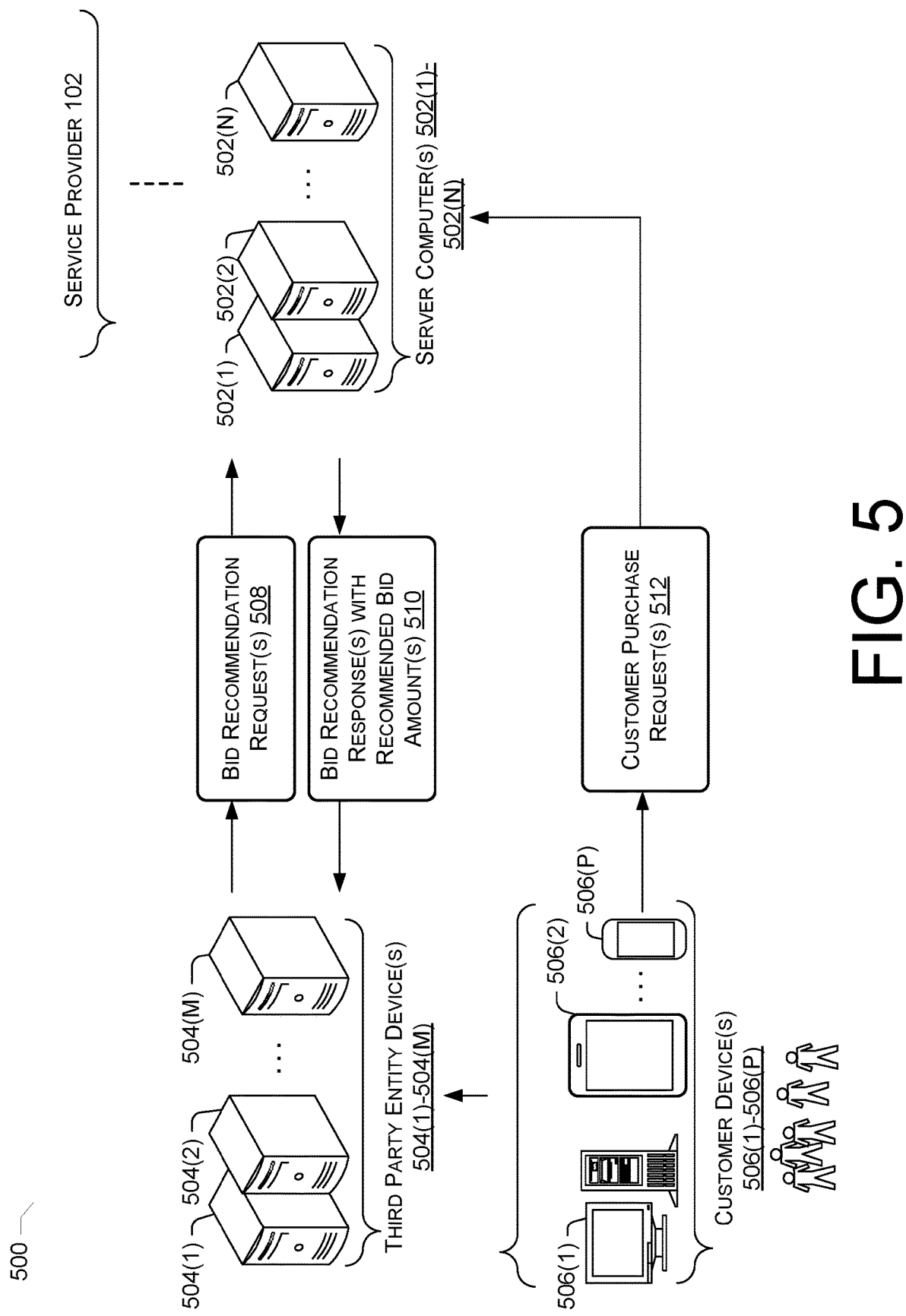
FIG. 5 illustrates an example environment including one or more server computers configured to complete bid recommendation management in conjunction with one or more service providers, one or more third-party entities, and one or more customers.

FIG. 5 illustrates an example environment 500 including one or more server computers 502(1)-502(N) configured to complete bid recommendation management in conjunction with one or more service providers, one or more third-party entities, and one or more customers. The server computers 502(1)-502(N) of the service provider 102 operate interactively with one or more third party entity devices 504(1)-504(M) and one or more customer devices 506(1)-506(P) to enable the service provider 102 to maintain a graph network.

In order to maintain the graph network, the servers 502(1)-502(N) can input information from the customer devices 506 and the third party entity devices. The information input from the customer devices 506 can include customer features (e.g., one or more customer features 120) and device features (e.g., one or more device features). For example, the server computers 502 can receive one or more customer purchase requests 512 (e.g., purchase request signals) that include the customer features 120 and the device features. Each of the plurality of purchase request signals 512 can represent a purchase of a product identified by a product identifier. Each of the plurality of purchase request signals 512 can include a merchant identifier representing a merchant that provides the product purchased from the service provider on behalf of the merchant.

The servers 502(1)-502(N) can maintain the graph network based on information received from the third party entity device 106, the information including at least one of advertisement placement features (e.g., one or more advertisement placement features 114, bid request features (e.g., one or more bid request features 116), or time features (e.g., time features 118). The third party entity device 106 can construct and transmit a bid recommendation request 508 including the base bid amount, to the servers 502(1)-502(N). The servers 502(1)-502(N) can calculate a bid recommendation amount based at least in part on the information provided by the one or more customers 500 and the one or more third-party entities 500. For example. The servers 502(1)-502(N) can calculate a propensity score (e.g., a propensity score 124), and calculate a bid recommendation amount based on the propensity score. The servers 502(1)-502(N) can transmit the bid recommendation response 510 with the recommendation bid amount to the third party entity devices 504.

In some embodiments, the servers 502(1)-502(N) can receive customer purchase history from a third party entity device 504. The customer purchase history received from the third party entity device 504 can be based on products that are purchased from the third party entity device 504 and by the customer associated with the customer device 506. Additionally or alternatively, the customer purchase history received from the third party entity device 504 can be based on products purchased from the third party entity device 504 and by other customers. For example, the customer purchase history received from the third party entity device 504 can include information unique to the third party entity device 504. The servers 502(1)-502(N) can determine a product network based on the customer purchase history associated with the service provider 102, and/or the customer purchase history received from the third party entity device 504. This product network can be determined in a similar way as described above for the product network determined based on the customer purchase history associated with the service provider 102. For example, servers 502(1)-502(N) can utilize the recommended bid amount calculation module 202 to determine, in a similar way as described above, a recommended bid amount based on this product network. The servers 502(1)-502(N) can confidentially store and utilize the customer purchase history received from the third party entity device 504. For example, the servers 502(1)-502(N) can refrain from providing, to other third party entity devices, access to the customer purchase history received from the third party entity device 504.

Unlike the existing third party entity devices that only have information associated with advertisements previously selected by customers, the third party entity device determines bid amounts based on information related to relationships between products in the previously selected advertisements and other related products. The third party entity device is able to receive the information from the server computers 502(1)-502(N). The third party entity device is able to transmit bids to a publisher for advertisements associated with the related products, not just on advertisements associated with products that are similar or equivalent to products previously purchased by the customer.

The third party entity devices 504(1)-504(M) can include a processor, a memory, a removable storage, a non-removable storage, and a user interface (UI). It is to be understood in the context of this disclosure that the third party entity devices 504 can be implemented as a single device or as a plurality of devices with modules and data distributed among them.

The customer devices 506(1)-506(P) can include a processor, a memory, a removable storage, a non-removable storage, and a UI. It is to be understood in the context of this disclosure that the customer device 506 can be implemented as a single device or as a plurality of devices with modules and data distributed among them.

Figure 6:
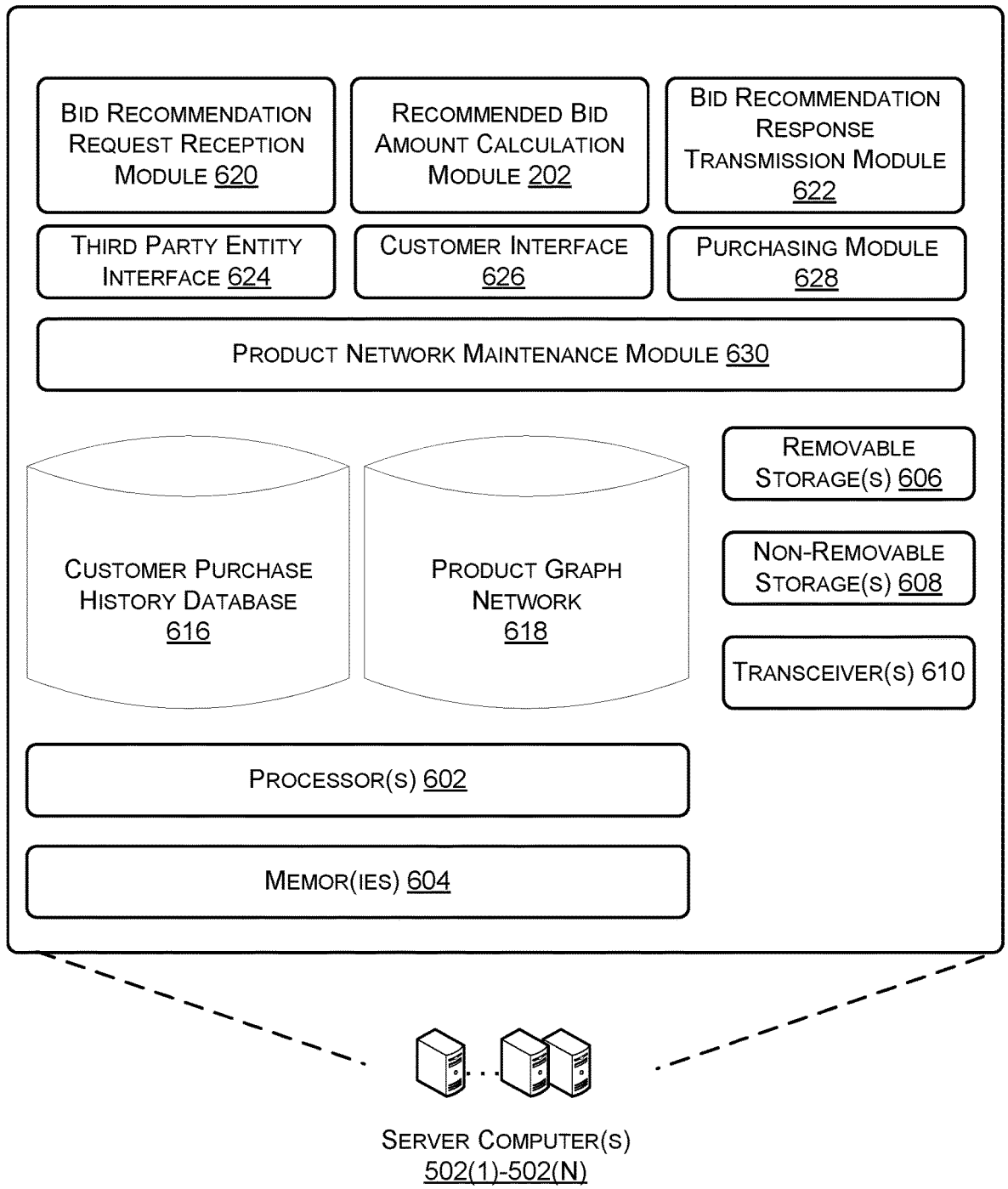
FIG. 6 shows an illustrative service provider for maintaining a product graph network.

FIG. 6 shows an illustrative service provider 600 for maintaining a product graph network. In some embodiments, the service provider 600 can correspond to one or more of the server computers 502(1)-502(N). In various embodiments, a server computer 502 comprises a processor 602, a memory 604, a removable storage 606, and a non-removable storage 608. It is to be understood in the context of this disclosure that the server computer 502 can be implemented as a single device or as a plurality of devices with modules and data distributed among them. For example, the processor 602, the memory 604, the removable storage 606, the non-removable storage 608, the one or more input devices 610, and the one or more output devices 612 can be implemented on server computers 600 of the one or more of the server computers 502(1)-502(N).

As illustrated, the server computer 502 comprises the memory 604 storing a customer purchase history database 616 and a product graph network 618. Also, the server computer 502 includes at least one of a bid recommendation request reception module 620, a recommended bid amount calculation module (e.g., recommended bid amount calculation module 202), a bid recommendation response transmission module 622, a third part entity interface 624, a customer interface 626, a purchasing module 628, or a product graph network maintenance module 630.

In various embodiments, the memory 604 is volatile (such as RAM), non-volatile (such as ROM, flash memory, etc.) or some combination of the two. The customer purchase history database 616 and the product graph network 618 stored in the memory 604 can include files and databases.

The bid recommendation request reception module 620 can receive a bid recommendation request 508 including the base bid amount, from the third party entity device 106. The recommended bid amount calculation module 202 can calculate a bid recommendation amount based at least in part on the information provided by a customer device (e.g., customer device 104) and a third-party entity device (e.g., third-party entity device 106). The bid recommendation response transmission module 622 can transmit the bid recommendation response 510 with the recommendation bid amount to the third party entity devices 504.

The third party entity interface 106 can receive information input by a third party entity and to the third part entity device 106. The customer interface 626 can receive information input by a customer and to the customer device 104. The purchasing module 628 can determine a recommended bid amount for placing an advertisement, based on the identifier of the advertisement output by a final ranking comparator (e.g., a final ranking comparator 134). The identifier of the advertisement can be associated with a ranking score that is equal to or higher than the other ranking scores input to the final ranking comparator 134. The product graph network maintenance module 630 can maintain graph network features (e.g., graph network features 122) that are utilized by the recommended bid amount calculation module 202 to determine the recommended bid amount.

The customer purchase history database 616 can store customer purchase history for each of the customers. The product graph network 618 can store the product network maintained by the server computers 502, based on the customer purchase history.

In some embodiments, the processor 602 is a central processing unit (CPU), a graphics processing unit (GPU), or other processing unit or component known in the art, or any combination thereof.

The server computer 502 also includes additional data storage devices (removable and/or non-removable) such as, for example, magnetic disks, optical disks, or tape. Such additional storage is illustrated in FIG. 6 by removable storage 606 and non-removable storage 608. Tangible computer-readable media can include volatile and nonvolatile, removable and non-removable media implemented in any method or technology for storage of information, such as computer readable instructions, data structures, program modules, or other data. Memory 604, removable storage 606, and non-removable storage 608 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the server computer 502. Any such tangible computer-readable media can be part of the service provider 300.

As illustrated in FIG. 6, the server computer 502 also includes one or more wired or wireless transceivers 610. For example, the transceivers 610 can include a network interface card (NIC), a network adapter, a LAN adapter, or a physical, virtual, or logical address to connect to the customer device 104 and/or the third party entities 106, for example. To increase throughput when exchanging wireless data, the transceivers 600 can utilize multiple-input/multiple-output (MIMO) technology. The transceivers 600 can comprise any sort of wireless transceivers capable of engaging in wireless, radio frequency (RF) communication. The transceivers 600 can also include other wireless modems, such as a modem for engaging in Wi-Fi, WiMax, Bluetooth, or infrared communication.

FIG. 7 illustrates a process 700 for maintaining a product network within a third party entity management system to determine an interest level of a customer with respect to a product, in accordance with embodiments of the disclosure. For example, aspects of the process 700 can be performed by the server computer 502, as illustrated in FIG. 6.

At block 702, the process includes receiving, by an entity device 102 associated with a service provider and from a customer device 104, at least one purchase request signal that includes a customer identifier associated with the customer device 104. The entity device 102 can store information associated with a purchase of a product (e.g., flat screen TV) to maintain a product network. The product network can include information associated with the product and other products (e.g., sound bar or game console) purchased by other customers.

At block 704, the process includes maintaining a product network including a first node 206 including a first product identifier representing a first product that was purchased by the customer; a second node 206 including a second product identifier representing a second product, both the first product and the second product being purchased by a plurality of first customers, via the service provider; and a third node 206 including a third product identifier representing a third product, both the first product and the third product by a plurality of second customers, via the service provider. Nodes 206 of the product network can be utilized to identify a relationship between the first product purchased by the customer and the second product purchased by other customers. The nodes 206 can be utilized to identify a relationship between the first product purchased by the customer and the third product purchased by other customers.

At block 706, the process includes determining, based at least in part on the product network, a first connection between the first product and the second product and a second connection between the first product and the third product. The connections can be utilized to track the relationships between the products for purposes of analyzing the interest of the customer in the second product or the third product.

At block 708, the process includes determining, based at least in part on the first connection being greater than the second connection, an interest level of the customer with respect to the second product. The interest level of the customer can be utilized to assist the third party entity device 106 in making a determination of an amount of a bid for an advertisement to be presented via the customer device 104.

At block 710, the process includes calculating a recommended bid amount associated with the second product based at least in part on the interest level. The recommended bid amount can be higher for a bid for an advertisement for the second product than for the third product, based on the interest level of the customer for the second product being higher than for the third product.

At block 712, the process includes transmitting, to the third party entity device 106 associated with the second product, the recommended bid amount. The third party entity device 106 can transmit a bid to a publisher that controls presentation of the advertisement via the customer device 104, based on the recommended bid amount.

Figure 8:
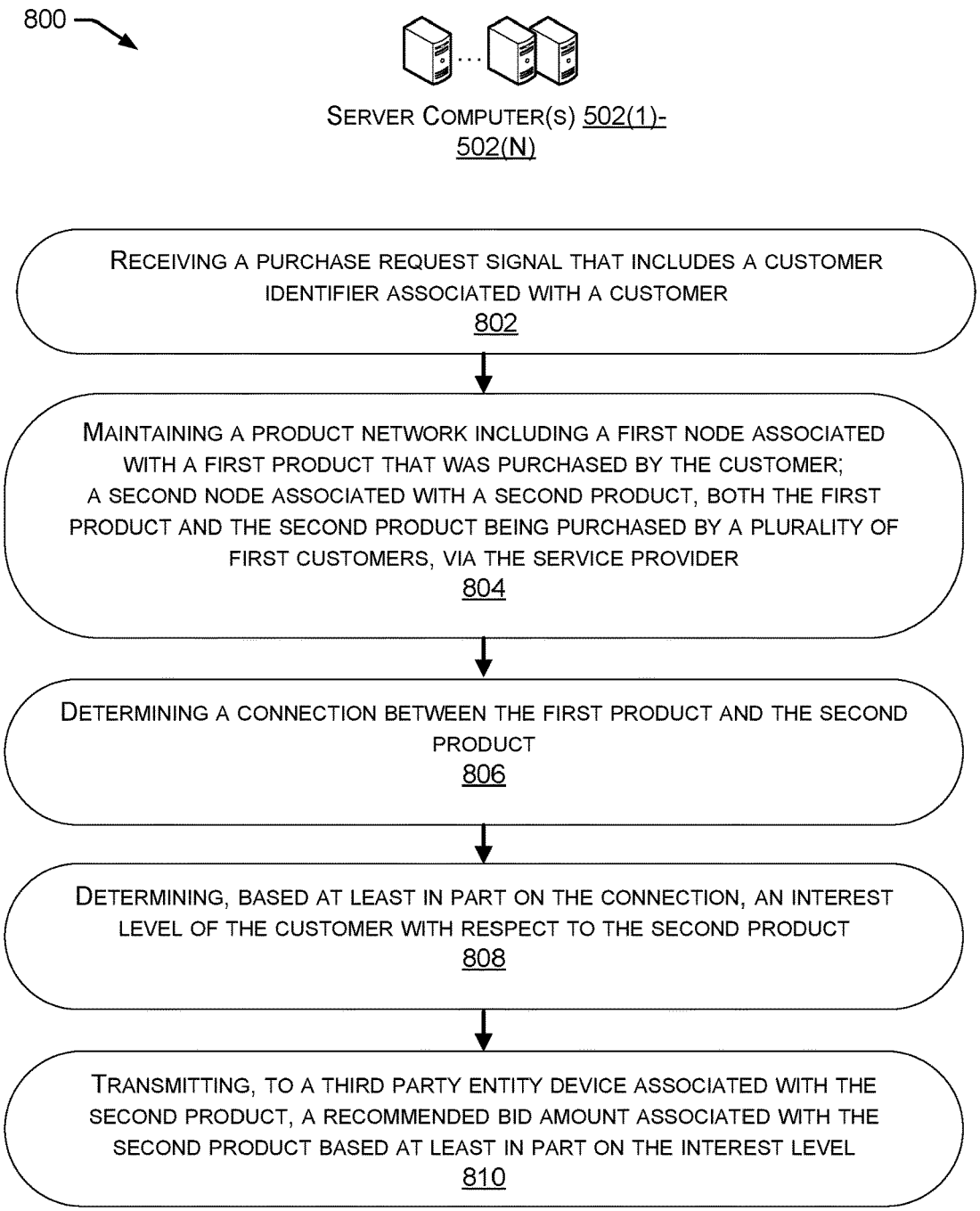
FIG. 8 illustrates a process for determining an interest level of a customer with respect to a product based on a connection between the product and another product, in accordance with embodiments of the disclosure.

FIG. 8 illustrates a process 800 for determining an interest level of a customer with respect to a product based on a connection between the product and another product, in accordance with embodiments of the disclosure. For example, aspects of the process 800 can be performed by the server computer 502, as illustrated in FIG. 6.

At block 802, the process includes receiving a purchase request signal that includes a customer identifier associated with the customer device 104. An entity device 102 of a service provider can store information associated with a purchase of a product (e.g., flat screen TV) to maintain a product network. The product network can include information associated with the product and other products (e.g., sound bar or game console) purchased by other customers.

At block 804, the process includes maintaining a product network including a first node 206 associated with a first product that was purchased by the customer; a second node 206 associated with a second product, both the first product and the second product being purchased by a plurality of first customers, via the service provider. Nodes 206 of the product network can be utilized to identify a relationship between the first product purchased by the customer and the second product purchased by other customers.

At block 806, the process includes determining a connection between the first product and second product. The connection can be utilized to track the relationship between the products for purposes of analyzing the interest of the customer in the second product.

At block 808, the process includes determining based at least in part on the connection, an interest level of the customer with respect to the second product. The interest level of the customer can be utilized to assist the third party entity device 106 in making a determination of an amount of a bid for an advertisement to be presented to the customer.

At block 810, the process includes transmitting, to third party entity device 106 associated with the second product, a recommended bid amount associated with the second product based at least in part on the interest level. The service provider can provide the recommended bid amount with greater accuracy based on the connection that indicates the relationship between the first product and the second product.

What is claimed is:

1. A computer-implemented method comprising:
   receiving, by a service provider device and from a first customer device associated with device data, at least one purchase request signal that includes a customer identifier associated with a customer;
   maintaining, by the service provider device, a product network, comprising:
   a first node including a first product identifier representing a first product that was purchased by the customer, based at least in part on at least one first product purchase selection of at least one first product purchase link, the at least one first product purchase selection being received from the customer via at least one first user input to a first user interface (UI) of the first customer device;
   a second node including a second product identifier representing a second product, wherein a plurality of first customers purchased both the first product and the second product via the service provider device, based at least in part on at least one second product purchase selection of at least one second product purchase link, the at least one second product purchase selection being received from at least one of the plurality of first customers via at least one second user input to at least one second UI of at least one second customer device; and
   a third node including a third product identifier representing a third product, wherein a plurality of second customers purchased both the first product and the third product via the service provider device, based at least in part on at least one third product purchase selection of at least one third product purchase link, the at least one third product purchase selection being received from at least one of the plurality of second customers via at least one third user input to at least one third UI of at least one third customer device;
   inputting, into a machine learning (ML) model, the product network and the device data;
   determining, by the ML model and based at least in part on the product network and the device data, a first connection between the first product and the second product and a second connection between the first product and the third product;

outputting, by the ML model and based at least in part on the first connection being greater than the second connection, an interest level of the customer with respect to the second product;

calculating a recommended bid amount associated with the second product based at least in part on the interest level; and transmitting, to a third party entity device associated with the second product and based at least in part on the recommended bid amount being greater than or equal to a threshold bid amount, a bid recommendation response including the recommended bid amount, the recommended bid amount and the device data being utilized by the third party entity device to transmit a bid message for causing presentation of content by a display of the first customer device, the recommended bid amount being included in a plurality of recommended bid amounts being transmitted to a first group of third party entity devices that includes the third party entity device, a first number of bid related computational tasks performed by the first group of third party entity devices being less than a second number of bid related computation tasks performed by a second group of third party entity devices, the second group of third party entity devices not receiving any recommended bid amounts.

2. The computer-implemented method of claim 1, wherein:
the product network further comprises a link between the first node and the second node, the link representing the first connection that indicates a number of the plurality of first customers; and
the interest level of the customer with respect to the second product is determined further based at least in part on a distance score associated with the link, the distance score representing the number of the plurality of first customers.

3. The computer-implemented method of claim 1, further comprising:
determining the interest level of the customer further based at least in part on a path score associated with the second node, the path score representing a number of products, with which the second node is associated and which were purchased by customers that also purchased the second product.

4. The computer-implemented method of claim 3, wherein the interest level of the customer with respect to the second product is determined further based at least in part on a second path score associated with the third node, the second path score representing a second number of products, with which the third node is associated and which were purchased by second customers that also purchased the third product.

5. The computer-implemented method of claim 4, wherein the path score is greater than the second path score based at least in part on the number of products that were purchased by the customers that also purchased the second product being greater than the second number of products which were purchased by the second customers that also purchased the third product.

6. The computer-implemented method of claim 1, further comprising:
determining the interest level of the customer further based at least in part on a path score representing a number of products, with which the second node is associated and which were purchased by customers that also purchased the second product;

calculating:
a propensity score indicating the interest level of the customer with respect to the second product based at least in part on the path score;
a base bid amount associated with the second product, the base bid amount being set by the third party entity device as a default amount of a bid utilized to calculate the recommended bid amount; and
a pacing score associated with the second product, the pacing score being based at least in part on a comparison between i) a number of customers to which an advertisement for the second product was previously presented and ii) a threshold number of customers set by the third party entity device; and
calculating the recommended bid amount associated with the second product based at least in part on the base bid amount, the propensity score, and the pacing score.

7. The computer-implemented method of claim 1, further comprising:
calculating a distance score based at least in part on a link between the first node and the second node, the link representing the first connection indicating a number of the plurality of first customers, the interest level of the customer with respect to the second product being further determined based at least in part on the distance score.

8. The computer-implemented method of claim 1, further comprising:
determining, based at least in part on the product network, a link between the first node and the third node, the link representing the second connection indicating a number of the plurality of second customers, the interest level of the customer with respect to the second product being determined further based at least in part on a distance score associated with the link.

9. The computer-implemented method of claim 1, further comprising:
determining that the customer is likely to purchase the second product further based at least in part on:
a first path score associated with the second node, the first path score representing a first number of products, with which the second node is associated and which were purchased by first customers that also purchased the second product; and
a second path score associated with the third node, the second path score representing a second number of products, with which the third node is associated and which were purchased by second customers that also purchased the third product, the second path score being less than the first path score.

10. The computer-implemented method of claim 9, further comprising:
determining that the customer visited a product page via the service provider device associated with the second product in response to the customer selecting an advertisement via a website of a publisher that is displayed via a web browser on the first customer device.

11. A non-transitory computer-readable storage medium having computer-executable instructions stored thereupon which, when executed by one or more processors, cause the one or more processors to perform operations comprising:
receiving, by a service provider device and from a first customer device of a customer, at least one purchase request signal that includes a customer identifier associated with the first customer device;
maintaining a product network, comprising:

a first node including a first product identifier representing a first product that was purchased by the customer, based at least in part on at least one first product purchase selection being received via at least one first user input to the first customer device; and
a second node including a second product identifier representing a second product, wherein a plurality of customers purchased both the first product and the second product via the service provider device, based at least in part on at least one second product purchase selection being received via at least one second user input to at least one second customer device;
determining, by a machine learning (ML) model and based at least in part on the product network, a connection between the first product and the second product;
outputting, by the ML model and based at least in part on the connection, an interest level of the customer with respect to the second product;
calculating a recommended bid amount associated with the second product based at least in part on the interest level; and
transmitting, to a third party entity device and based at least in part on the recommended bid amount being greater than or equal to a threshold bid amount, a recommendation response comprising the recommended bid amount, the recommended bid amount being utilized by the third party entity device to transmit a bid message for causing presentation of content by a display of the first customer device, the recommended bid amount being included in a plurality of recommended bid amounts being transmitted to a first group of third party entity devices that includes the third party entity device, a first number of bid related computational tasks performed by the first group of third party entity devices being less than a second number of bid related computation tasks performed by a second group of third party entity devices, the second group of third party entity devices not receiving any recommended bid amounts.

12. The computer-readable storage medium of claim 11, wherein:
the product network further comprises a link between the first node and the second node, the link representing the connection that indicates a number of the plurality of customers; and
the interest level of the customer with respect to the second product is determined further based at least in part on a distance score associated with the link, the distance score representing the number of the plurality of customers.

13. The computer-readable storage medium of claim 12, the operations further comprising:
determining the interest level of the customer further based at least in part on a path score associated with the second node, the path score representing a number of products, with which the second node is associated and which were purchased by customers that also purchased the second product.

14. The computer-readable storage medium of claim 13, wherein:
the product network further comprises a third node including a third product identifier representing a third product, wherein a plurality of second customers purchased both the first product and the third product via the service provider device; and the interest level of the customer with respect to the second product is determined further based at least in part on a second path score associated with the third node, the second path score representing a second number of products, with which the third node is associated and which were purchased by second customers that also purchased the third product.

15. A system comprising:
at least one processor; and
at least one non-transitory computer-readable storage medium having computer-executable instructions stored thereon which, when executed on the at least one processor, cause the system to perform operations comprising:
receiving, by a service provider device and from a first customer device of a customer, at least one purchase request signal that includes a customer identifier associated with the first customer device;
maintaining a product network, comprising:
a first node including a first product identifier representing a first product that was purchased by the customer, based at least in part on at least one first product purchase selection being received via at least one first user input to the first customer device; and
a second node including a second product identifier representing a second product, wherein a plurality of first customers purchased both the first product and the second product via the service provider device, based at least in part on at least one second product purchase selection being received via at least one second user input to at least one second customer device;
determining, by a machine learning (ML) model and based at least in part on the product network, a connection between the first product and the second product;
outputting, by the ML model and based at least in part on the connection, an interest level of the customer with respect to the second product;
calculating a recommended bid amount based at least in part on the interest level; and
transmitting, to a third party entity device and based at least in part on the recommended bid amount being greater than or equal to a threshold bid amount, a recommendation response comprising the recommended bid amount, the recommended bid amount being utilized by the third party entity device to transmit a bid message causing presentation of content by a display of the first customer device, the recommended bid amount being included in a plurality of recommended bid amounts being transmitted to a first group of third party entity devices that includes the third party entity device, a first number of bid related computational tasks performed by the first group of third party entity devices being less than a second number of bid related computation tasks performed by a second group of third party entity devices, the second group of third party entity devices not receiving any recommended bid amounts.

16. The system of claim 15, wherein:
the product network further comprises a link between the first node and the second node, the link representing the connection that indicates a number of the plurality of first customers; and the interest level of the customer with respect to the second product is determined further based at least in part on a distance score associated with the link, the distance score representing the number of the plurality of first customers.

17. The system of claim 16, the operations further comprising:
determining the interest level of the customer further based at least in part on a path score associated with the second node, the path score representing a number of products, with which the second node is associated and which were purchased by customers that also purchased the second product.

18. The computer-implemented method of claim 1, further comprising:
causing presentation, via the display of the first customer device, of a service provider webpage including a product purchase notification,
the first product being purchased by the customer based at least in part on a selection in the at least one first product purchase selection, of a link in the at least one first product purchase link, the link being presented in the product purchase notification,
a signal in the at least one purchase request signal being received by the service provider device and from the first customer device based at least in part on the selection of the link.

19. The computer-implemented method of claim 1, wherein:
the bid message is utilized by the third party entity device to transmit, to a publisher device and in response to a bid request received from the publisher device, the bid message as a bid response, the bid response including the recommended bid amount; and
the third party entity device causes presentation, via the display of the first customer device, of a product purchase notification associated with the second product, based at least in part on an auction of the publisher device being won by the third party entity device, the auction being won by the third party entity device based at least in part on the recommended bid amount being greater than at least one other bid amount of at least one other bid message transmitted by at least one other third party entity device to the publisher device.

20. The computer-implemented method of claim 1, wherein calculating the recommended bid amount further comprises calculating the recommended bid amount associated with the second product based at least in part on two or more of a plurality of device features associated with the first customer device, the plurality of device features including:
a cellular carrier identity associated with a cellular carrier providing a wireless network by which the device data is received;
an internet protocol (IP) address by which the first customer device connects to the wireless network;
a model identifier of the first customer device;
an operating system identifier associated with an operating system being operated by the first customer device;
a screen size of the first customer device;
a screen orientation of the first customer device, the screen orientation being portrait or landscape; or
a connection type of first customer device and with the wireless network.

* * * * *